(12) United States Patent
Tuli

(10) Patent No.: US 10,771,613 B2
(45) Date of Patent: *Sep. 8, 2020

(54) INPUTTING DATA USING A MOBILE APPARATUS

(71) Applicant: Microsoft Technology Licensing, LLC, Redmond, WA (US)

(72) Inventor: Apaar Tuli, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,478

(22) Filed: Jul. 6, 2018

(65) Prior Publication Data

US 2019/0141180 A1   May 9, 2019

Related U.S. Application Data

(63) Continuation of application No. 14/684,615, filed on Apr. 13, 2015, now Pat. No. 10,038,775.

(51) Int. Cl.
| | |
|---|---|
| *H04M 1/00* | (2006.01) |
| *H04M 1/725* | (2006.01) |
| *G06F 3/0354* | (2013.01) |
| *G06F 3/0488* | (2013.01) |
| *G06K 9/00* | (2006.01) |
| *G06F 3/0482* | (2013.01) |
| *G06F 3/0484* | (2013.01) |

(52) U.S. Cl.
CPC .... *H04M 1/72563* (2013.01); *G06F 3/03545* (2013.01); *G06F 3/0482* (2013.01); *G06F 3/0484* (2013.01); *G06F 3/0488* (2013.01); *G06F 3/04883* (2013.01); *G06K 9/0002* (2013.01); *G06K 9/00087* (2013.01)

(58) Field of Classification Search
CPC ............ H04M 1/72563; G06F 3/04842; G06F 3/0488; G06F 3/0416; G06F 3/01
USPC ......................................................... 345/156
See application file for complete search history.

(56) References Cited

U.S. PATENT DOCUMENTS

| | | | |
|---|---|---|---|
| 8,136,053 | B1 | 3/2012 | Miller et al. |
| 8,218,734 | B2 | 7/2012 | Bhupati |
| 8,638,385 | B2 | 1/2014 | Bhogal |
| 9,009,630 | B2 | 4/2015 | Kruzeniski et al. |
| 9,395,800 | B2 | 7/2016 | Liu et al. |
| 9,658,704 | B2 | 5/2017 | Bernstein et al. |
| 9,753,556 | B2 | 9/2017 | Bernstein et al. |

(Continued)

OTHER PUBLICATIONS

"Evernote widget on iPad", Retrieved From: https://discussion.evernote.com/topic/67360-new-quick-note-widget-on-your-ios-device/, 10 Pages.

(Continued)

*Primary Examiner* — William D Cumming

(57) ABSTRACT

A mobile apparatus comprises at least one processing unit and at least one memory. The at least one memory stores program instructions that, when executed by the at least one processing unit, cause the mobile apparatus to detect an intention to input data on a screen relating to a locked state of the mobile apparatus, enter into an inking mode, the inking mode enabling input of data directly on the screen relating to the locked state, and capture data input on the screen relating to the locked state while the mobile apparatus remains in the locked state.

20 Claims, 5 Drawing Sheets

(56) References Cited

U.S. PATENT DOCUMENTS

| | | | |
|---|---|---|---|
| 10,038,775 B2* | 7/2018 | Tuli | G06F 3/04883 |
| 2014/0015776 A1 | 1/2014 | Kim et al. | |
| 2014/0160045 A1 | 6/2014 | Park et al. | |
| 2016/0252954 A1* | 9/2016 | Tuli | G06F 3/01 |
| | | | 345/156 |
| 2016/0301796 A1* | 10/2016 | Tuli | H04M 1/72563 |
| 2017/0068374 A1* | 3/2017 | Jansky | G06F 3/0416 |
| 2017/0068413 A1* | 3/2017 | Jansky | G06F 3/0488 |
| 2017/0090725 A1* | 3/2017 | Jansky | G06F 3/04842 |
| 2019/0141180 A1* | 5/2019 | Tuli | H04M 1/72563 |

OTHER PUBLICATIONS

"Lock Screen Notes by Microsoft", Retrieved From: https://www.microsoft.com/en-us/p/lock-screen-notes/9wzdncrdcrv7?activetab=pivot%3Areviewstab, 3 Pages.

* cited by examiner

INPUTTING DATA USING A MOBILE APPARATUS

CROSS REFERENCE TO RELATED APPLICATIONS

This application is a continuation of and claims priority to U.S. application Ser. No. 14/081,214, entitled "INPUTTING DATA USING A MOBILE APPARATUS," filed Sep. 30, 2015, now U.S. Pat. No. 10,038,775, which is incorporated herein in its entirety.

BACKGROUND

An apparatus, for example, a smart phone or a tablet computer, may have a touch-sensitive display via which a user is able to input data and control various functions of the apparatus. The apparatus may also comprise a note taking application which may be used to take notes. Input from the user on the display may be received via a finger of the user or via a pen or stylus.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one example, an apparatus is provided. The apparatus comprises at least one processing unit and at least one memory. The at least one memory stores program instructions that, when executed by the at least one processing unit, cause the mobile apparatus to detect an intention to input data on a screen relating to a locked state of the mobile apparatus, enter into an inking mode, the inking mode enabling input of data directly on the screen relating to the locked state, and capture data input on the screen relating to the locked state while the mobile apparatus remains in the locked state.

In another example, a method is provided. The method comprises detecting an intention to input data on a screen relating to a locked state of a mobile apparatus, entering into an inking mode, the inking mode enabling input of data directly on the screen relating to the locked state, and capturing data input on the screen relating to the locked state.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

Figure 1:
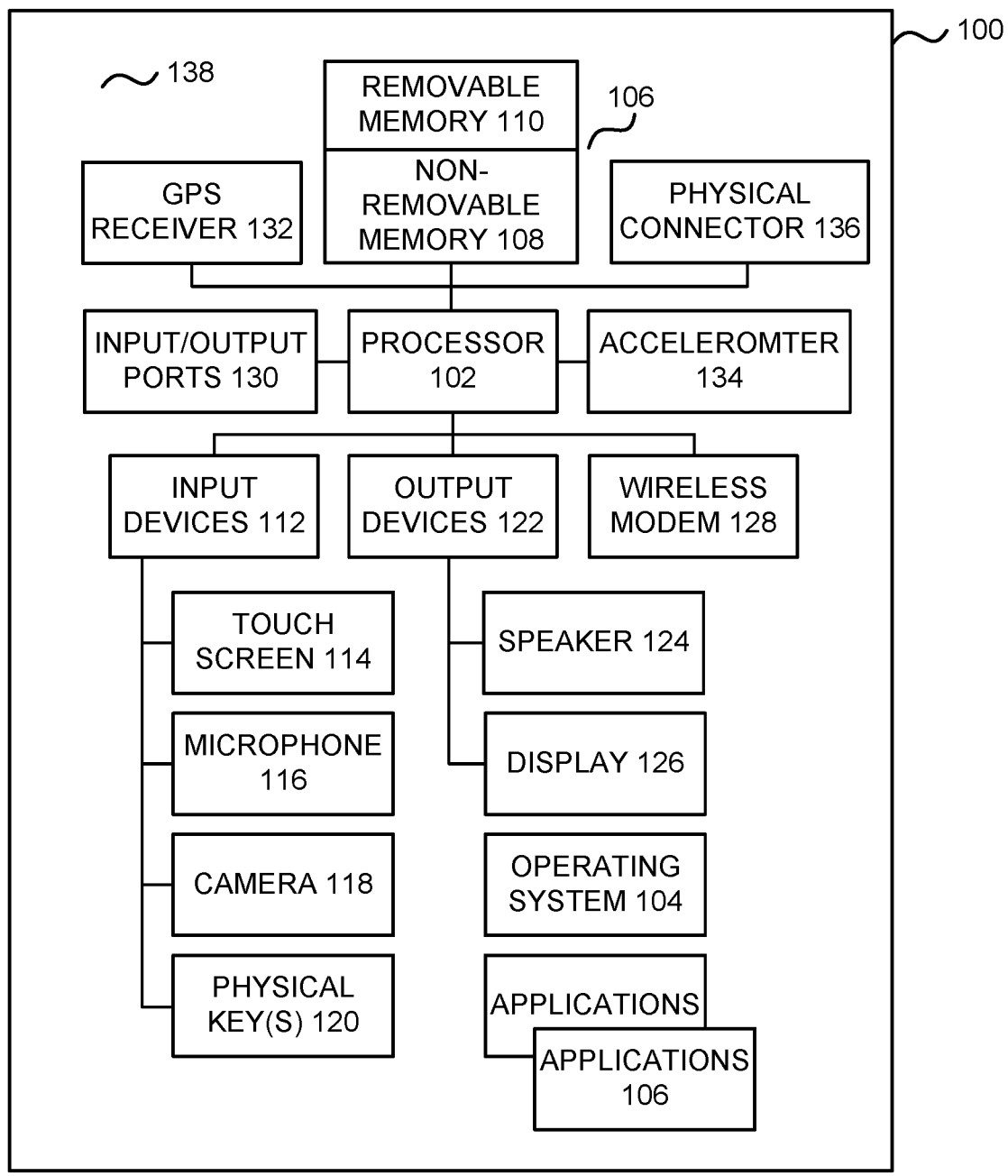
FIG. 1 is a system diagram depicting an exemplary mobile apparatus including a variety of optional hardware and software components.

FIG. 1 is a system diagram depicting an exemplary mobile apparatus 100 including a variety of optional hardware and software components, shown generally at 138. Any components 138 in the mobile apparatus can communicate with any other component, although not all connections are shown, for ease of illustration. The mobile apparatus can be any of a variety of computing devices (for example, a cell phone, a smartphone, a handheld computer, a tablet computer, a laptop computer, a Personal Digital Assistant (PDA), etc.) and can allow wireless two-way communications with one or more mobile communications networks, such as a cellular or satellite network.

The illustrated mobile apparatus 100 can include a controller or processor 102 (e.g., signal processor, microprocessor, ASIC, or other control and processing logic circuitry) for performing such tasks as signal coding, data processing, input/output processing, power control, and/or other functions. An operating system 104 can control the allocation and usage of the components 138 and support for one or more application programs 106. The application programs can include common mobile computing applications (e.g., email applications, calendars, contact managers, web browsers, messaging applications), or any other computing application.

The illustrated mobile apparatus 100 can include a memory 106. The memory 106 can include non-removable memory 108 and/or removable memory 110. The non-removable memory 108 can include RAM, ROM, flash memory, a hard disk, or other well-known memory storage technologies. The removable memory 110 can include flash memory or a Subscriber Identity Module (SIM) card, which is well known in GSM communication systems, or other well-known memory storage technologies, such as "smart cards." The memory 106 can be used for storing data and/or code for running the operating system 104 and the applications 106. Example data can include web pages, text, images, sound files, video data, or other data sets to be sent to and/or received from one or more network servers or other devices via one or more wired or wireless networks. The memory 106 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile apparatus 100 can support one or more input devices 112, such as a touchscreen 114, microphone 116, camera 118 and/or physical keys or a keyboard 120 and one or more output devices 122, such as a speaker 124 and a display 126. Other possible output devices (not shown) can include piezoelectric or other haptic output devices. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 106 can comprise speech-recognition software as part of a voice user interface that allows a user to operate the mobile apparatus 100 via voice commands. Further, the mobile apparatus 100 can comprise input devices and software that allows for user interaction via a user's spatial gestures, such as detecting and interpreting gestures to provide input to a gaming application.

A wireless modem 128 can be coupled to an antenna (not shown) and can support two-way communications between the processor 102 and external devices, as is well understood in the art. The modem 128 is shown generically and can include a cellular modem for communicating with the mobile communication network and/or other radio-based modems (e.g., BLUETOOTH or Wi-Fi). The wireless modem 128 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the mobile apparatus and a public switched telephone network (PSTN) etc.

The mobile apparatus 100 can further include at least one input/output port 130, a satellite navigation system receiver 132, such as a Global Positioning System (GPS) receiver, an accelerometer 134, and/or a physical connector 136, which can be a USB port, IEEE 1394 (FIREWIRE) port, and/or RS-232 port. The illustrated components 138 are not required or all-inclusive, as any components can deleted and other components can be added.

Figure 2:
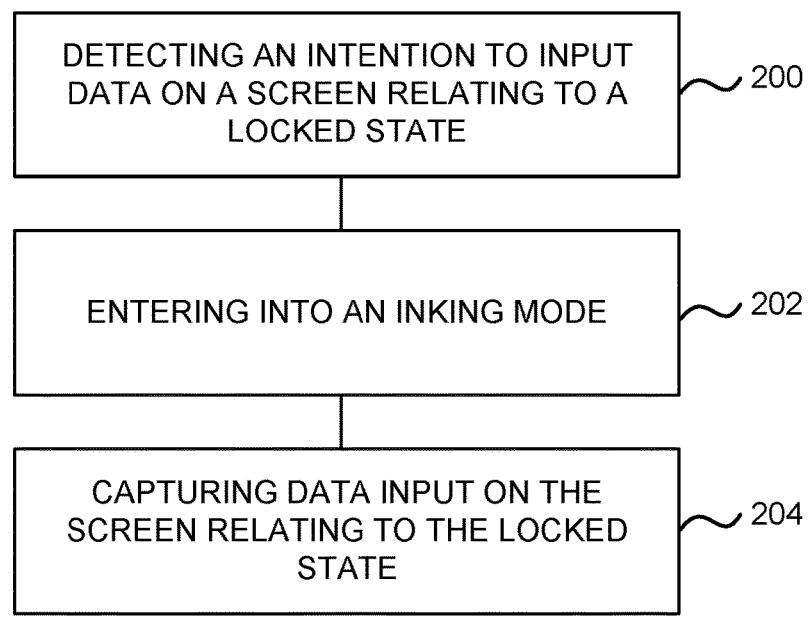
FIG. 2 illustrates an example of a method of operating a mobile apparatus.

FIG. 2 is a flowchart for operating a mobile apparatus. The mobile apparatus may be, for example, a smart phone, a tablet computer or any other mobile device having a touch-sensitive display. The touch-sensitive display may detect touch made by, for example, a finger or a stylus or pen.

The mobile apparatus may operate under a locked state. Under the locked state, the mobile apparatus may have one or more screens (i.e. views on a display of the mobile apparatus) which may be shown to a user. As is well understood in the art, a lock screen on a mobile apparatus is a display that appears when a user first powers up the mobile apparatus or when the mobile apparatus wakes up from a sleep mode. The lock screen may have some information displayed, such as cellular signal strength, a wi-fi indicator, time and date information, etc. The lock screen may also refer to a state when the display is blank or off. Typically, from the lock screen, the user is not able to access the majority of applications available. Another screen related to the locked state may be a low-power display mode (for example, a so called a glance screen). The low-power display mode refers to a locked state in which the mobile apparatus runs in a low-power mode. A display in the low-power display mode may show, for example, only an always-on clock when the mobile apparatus is locked thus enabling a user to glance at his phone and see the time without having to touch or unlock the device. The display may show also some further information, for example, battery status and information relating to various applications running in the mobile apparatus (for example, the amount of new emails received by an email application, the amount of new instant messaging application messages etc.).

At 200 an intention to input data on a screen relating to the locked state of the mobile apparatus is detected. The intention may mean that the user touches the display of the mobile apparatus with a finger or a pen or a stylus. The intention may also mean that the user does not touch the surface of the display with his finger or with the pen or stylus, but the mobile apparatus detects vicinity of the finger, pen or stylus to the display. In one example, when the user picks up the pen to hold it in his hand, it is possible to use an accelerometer or accelerometers in the pen to determine the intention to input data. It is also possible to have a capacitive touch sensitive area near the tip of the pen that can detect the user's grip on the pen. When the grip is detected, it may be used as an intention to input data. The intention may then be indicated to the mobile apparatus, for example, by using a wireless short-range transmission. The intention may also mean that the user presses a power button of the mobile apparatus. The intention may also mean that the mobile apparatus detects that the user holds the mobile apparatus in his hand. The intention may also mean that the user presses a button of the pen and the pen indicates this to the mobile apparatus for example, by using a wireless short-range transmission.

At 202 the mobile apparatus enters into an inking mode. The inking mode enables input of data directly on the screen relating to the locked state. At 204 data input on the screen relating to the locked state is captured while the mobile apparatus remains in the locked state. In other words, the user need not separately start an application, for example, a note taking application, in order to be able to input data on the screen. When the mobile apparatus shows a screen relating to a locked state (for example, a lock screen, a blank screen or a glance screen), the user is able to start typing or drawing on the screen immediately.

When the user is able to start providing data input directly on the screen relating to the locked state, a better end-user experience is provided. By doing away with unnecessary user interface and navigation, the fastest possible note-taking experience is enabled and this experience is similar than a note taking action with a pen and paper. Further, a new interaction layer is created with the mobile apparatus that is independent of the underlying visual user interface. This layer allows the user to interact and input content to the mobile apparatus, for example, using a pen, completely bypassing unnecessary interactions required to express intent to write. Further, the user may also be able to write on the mobile apparatus display without even pressing a single button on the mobile apparatus. In effect, the user does not need to waste time unlocking the mobile apparatus or interacting with unnecessary user interface functions. Further, as the user's intent to write may be captured by detecting the user's grip on the pen, it is possible to prepare for the act of note taking. Further, when a pen is used with a mobile apparatus, it is possible to create a cheaper version of the pen without any special electronics. The user can enable note taking by just bringing a capacitive stylus tip of the pen to the screen of the mobile apparatus.

Figures 3A, 3B:
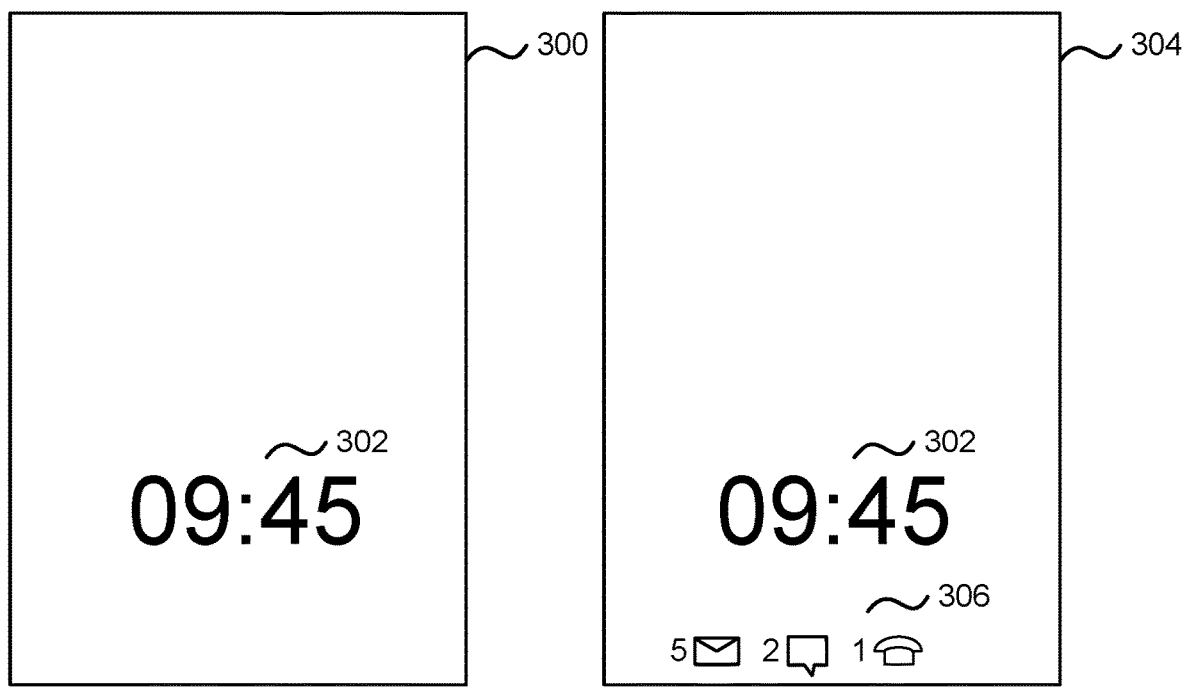
FIG. 3A illustrates an example of a screen relating to a locked state of a mobile apparatus.
FIG. 3B illustrates another example of a screen relating to a locked state of a mobile apparatus.

FIGS. 3A and 3B illustrate examples of a screen relating to a locked state of a mobile apparatus. As discussed above and as illustrated in FIG. 3A, the screen 300 may be a glance screen. When the glance screen is displayed the mobile apparatus runs in a low-power mode in a locked state. The glance screen may show, for example, only an always-on clock 302 when the mobile apparatus is locked thus enabling a user to glance at his phone and see the time without having to touch or unlock the device. The screen 304 illustrated in FIG. 3B provides some additional information on the screen. The screen 304 may comprise one or more indicators 306 which provide state information relating to one or more applications, for example, an email application, an instant messaging application etc. As already illustrated with reference to FIG. 2, the user is able to start typing or drawing on the screen 300, 304 immediately without manually or separately launching a separate application, for example, a note taking application.

Figure 4:
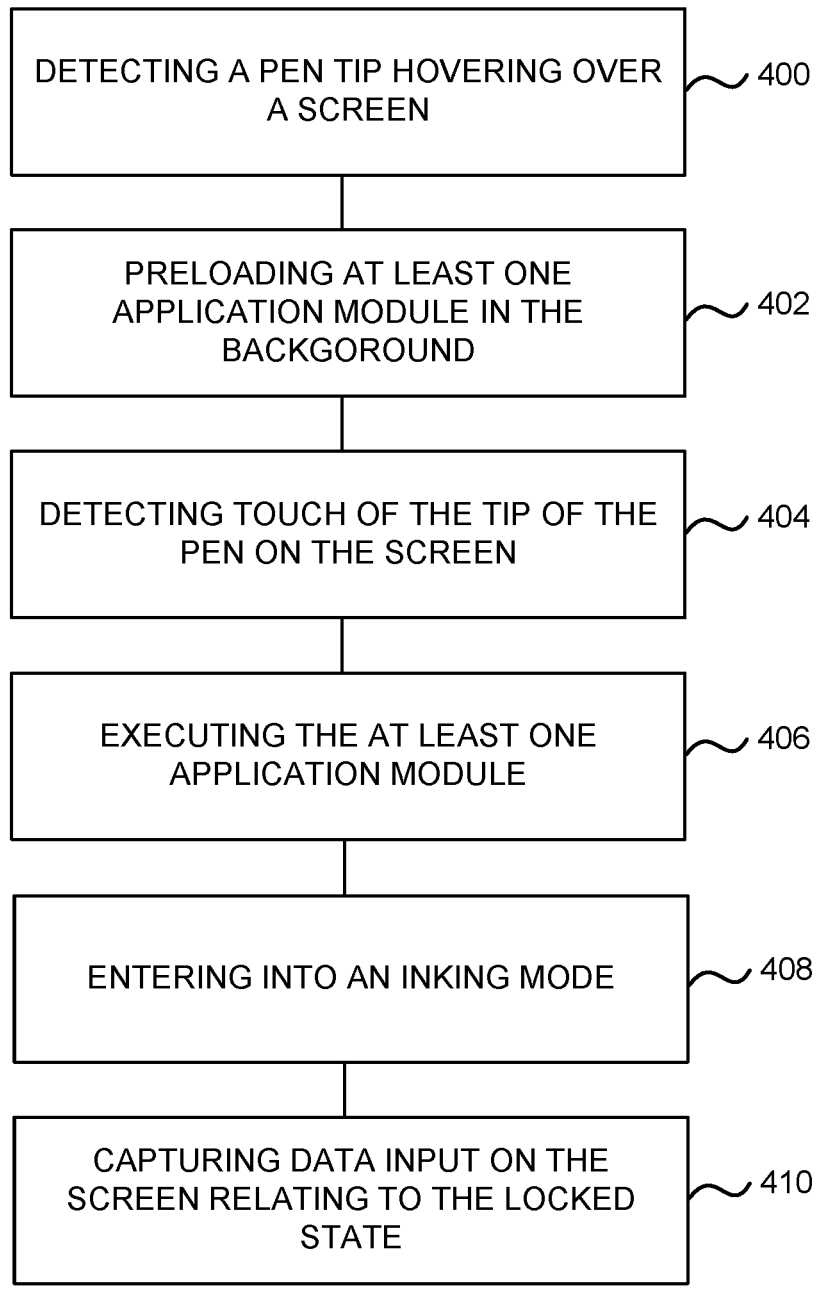
FIG. 4 illustrates an example of a method of operating a mobile apparatus.

FIG. 4 is a flowchart for operating a mobile apparatus. The mobile apparatus may be, for example, a smart phone, a tablet computer or any other mobile device having a touch-sensitive display. The touch-sensitive display may detect touch made by, for example, a finger or a stylus or pen. As already discussed with reference to FIG. 2, the mobile apparatus may operate under a locked state. Under the locked state, the mobile apparatus may have one or more screens (i.e. views on a display of the mobile apparatus) which may be shown to a user, for example, a lock screen or a glance screen. The lock screen may also refer to a screen state where the mobile apparatus is in a low-power display mode. In other words, the display of the mobile apparatus may be blank or off.

At 400, the mobile apparatus detects a tip of a pen hovering over the screen. The term hovering means that the tip of the pen is within a predetermined distance from the screen (for example, 10 millimeters) and has not yet touched the screen. At 402 when it is detected that the tip of the pen is hovering over the screen, at least one application module is preloaded in the background. Preloading means that the at least one application module is loaded but not executed yet. At 404 it is detected that the tip of the pen touches the screen. In response to detecting the tip of the pen, the at least one application module is executed, at 406. After execution data input on the screen can be captured while the mobile apparatus remains in the locked state. In other words, the user need not separately start an application, for example, a note taking application, in order to be able to input data on the screen. When the application module is loaded and executed only after detecting the pen tip, memory resources and processing power are saved.

At 408 the mobile apparatus enters into an inking mode. The inking mode enables input of data directly on the screen relating to the locked state. At 410 data input on the screen relating to the locked state is captured while the mobile apparatus remains in the locked state. In other words, the user need not separately start an application, for example, a note taking application, in order to be able to input data on the screen. When the mobile apparatus shows a screen relating to a locked state (for example, a lock screen or a glance screen), the user is able to start typing or drawing on the screen immediately.

In the example of FIG. 4 the user's intent to write may be captured using the hovering feature of the pen. This enables the mobile apparatus to prepare for the act of note taking.

Figure 5:
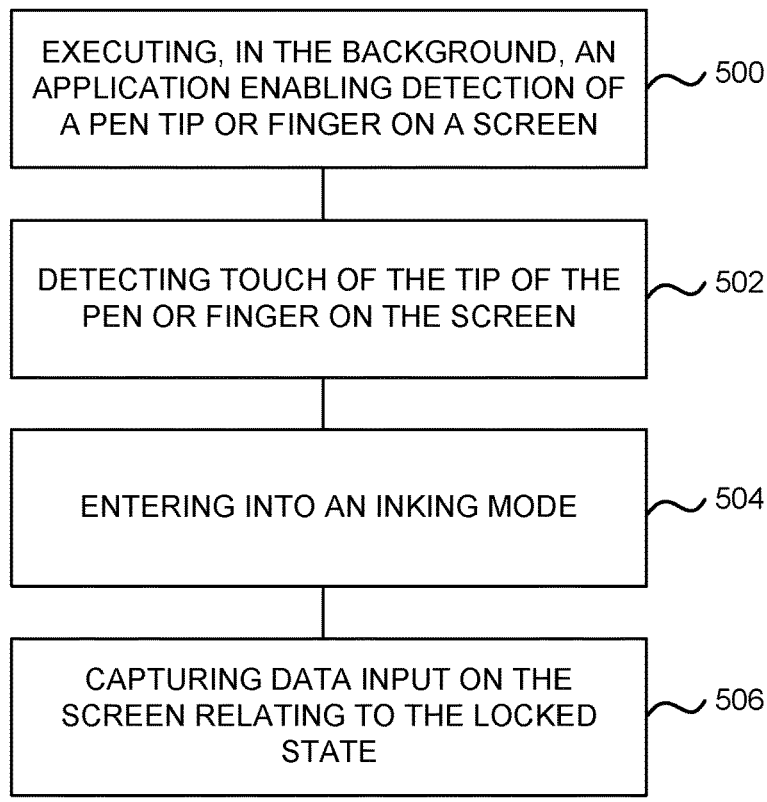
FIG. 5 illustrates an example of a method of operating a mobile apparatus.

FIG. 5 is a flowchart for operating a mobile apparatus. The mobile apparatus may be, for example, a smart phone, a tablet computer or any other mobile device having a touch-sensitive display. The touch-sensitive display may detect touch made by, for example, a finger or a stylus or pen. As already discussed with reference to FIG. 2, the mobile apparatus may operate under a locked state. Under the locked state, the mobile apparatus may have one or more screens (i.e. views on a display of the mobile apparatus) which may be shown to a user, for example, a lock screen, a blank screen or a glance screen. The lock screen may also refer to a state where the mobile apparatus is in a low-power display mode. In other words, the display may be blank or off.

At 500 an application is executed in the background, the application enabling detection of a pen tip of finger on the screen. "Background" may mean that the user may not know based on the information on the lock screen that the application enabling detection of the pen tip of finger on the screen during the locked state is being executed by the mobile apparatus.

At 502 a touch of a tip of the pen or a finger on the screen is detected. The touch may be detected using the normal touch sensing capabilities of the mobile apparatus. At 504 the mobile apparatus enters into an inking mode. The inking mode enables input of data directly on the screen relating to the locked state. At 506 data input on the screen relating to the locked state is captured while the mobile apparatus remains in the locked state. In other words, the user need not separately start an application, for example, a note taking application, in order to be able to input data on the screen. When the mobile apparatus shows a lock screen, a blank screen or a glance screen, the user is able to start typing or drawing on the screen immediately.

Figure 6:
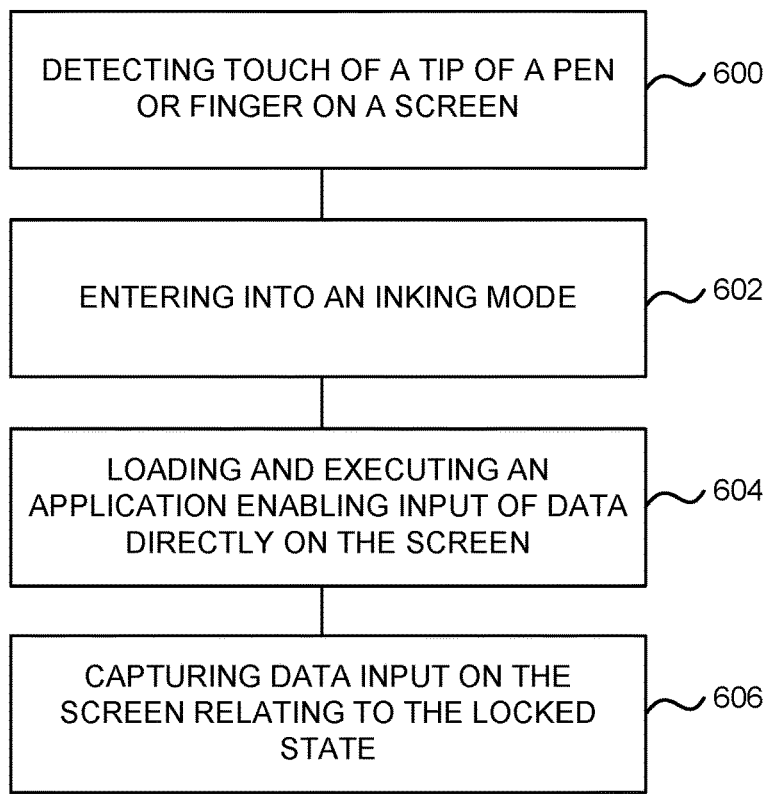
FIG. 6 illustrates an example of a method of operating a mobile apparatus.

FIG. 6 is a flowchart for operating a mobile apparatus. The mobile apparatus may be, for example, a smart phone, a tablet computer or any other mobile device having a touch-sensitive display. The touch-sensitive display may detect touch made by, for example, a finger or a stylus or pen. As already discussed with reference to FIG. 2, the mobile apparatus may operate under a locked state. Under the locked state, the mobile apparatus may have one or more screens (i.e. views on a display of the mobile apparatus) which may be shown to a user, for example, a lock screen, a blank screen or a glance screen. The lock screen may also refer to a screen state where the mobile apparatus is in a low-power display mode. In other words, the display of the mobile apparatus may be blank or off.

At 600 a touch of a tip of the pen or a finger on the screen is detected. The touch may be detected using the normal touch sensing capabilities of the mobile apparatus. At 602 the mobile apparatus enters into an inking mode. The inking mode enables input of data directly on the screen relating to the locked state. At 604 an application enabling input of data directly on the screen is loaded and executed. At 606 data input on the screen relating to the locked state is captured while the mobile apparatus remains in the locked state. In other words, the user need not separately start an application, for example, a note taking application, in order to be able to input data on the screen.

Figure 7A:
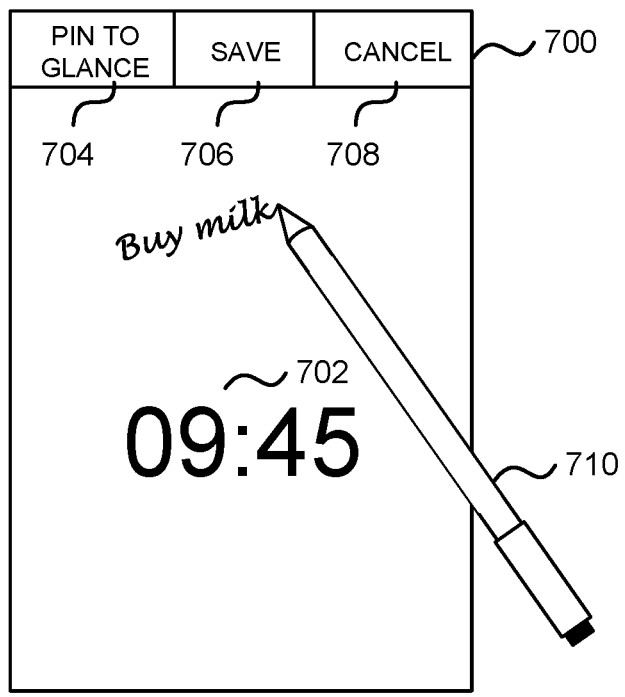
FIG. 7A illustrates an example screen on a display of a mobile apparatus.

FIG. 7A illustrates an example screen 700 on a display of a mobile apparatus. In this example a user has started writing a shop list on the screen with a pen 710. As illustrated in the earlier examples, the mobile apparatus has entered into an inking mode, the inking mode enabling input of data directly on the screen relating to the locked state. In another example, the user may touch a certain icon on the screen to enter the inking mode. The mobile apparatus may have entered the inking mode because the user has kept the pen tip in a certain part of the screen for a certain duration.

In FIG. 7A, the user uses the pen 710 to write shop list items on the screen 700. Before the user started writing the shop list a glance screen displaying only time 702 was shown on the display of the mobile apparatus. The glance screen may refer to a screen when the mobile apparatus is in a state where it runs in a low-power display mode. When the user starts writing on the screen 700, one or more processing options may be provided.

The user may pin the note to the glance screen. It means that when a "normal" glance screen is again provided by the mobile apparatus, the note written by the user is shown on the glance screen. The user may also save 706 the note in a memory of the mobile apparatus or in a cloud service. If the user does not want to pin or store the note, the user may select the cancel 708 option. In another example, the note may be automatically synchronized with the cloud service without the user having to explicitly select any processing options. It is also evident that FIG. 7A illustrates only examples of various possible processing options, and thus also other processing options (for example, send the note to a digital assistant provided by the mobile apparatus, make a search in the Internet etc.) not disclosed in FIG. 7A may be used.

Figure 7B:
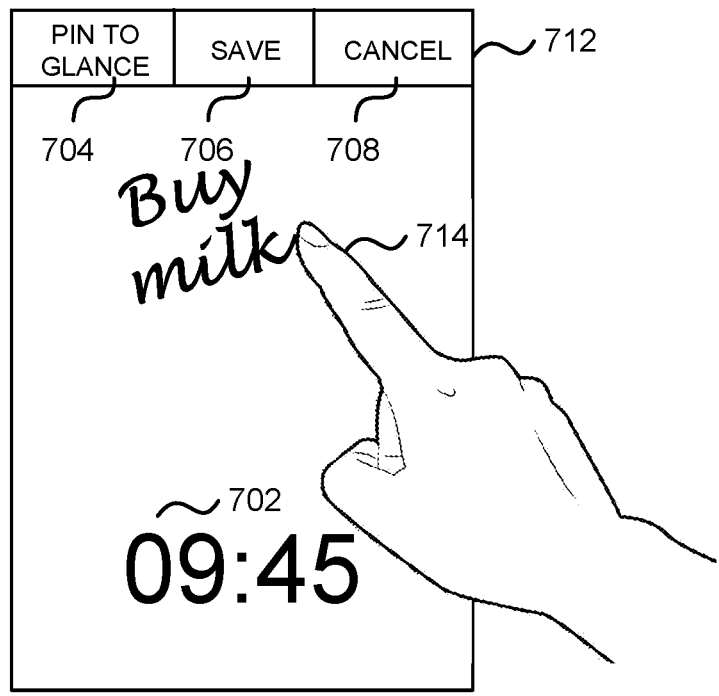
FIG. 7B illustrates an example screen on a display of a mobile apparatus.

FIG. 7B illustrates an example screen 712 on a display of a mobile apparatus. The example in FIG. 7B is identical with the example in FIG. 7A with the exception that instead of using the pen 710, the user uses a finger 714 to take the note.

When the user uses his finger to interact with the mobile apparatus, the user may provide a predetermined gesture with the finger 714 on the screen. The predetermined gesture provides an indication to the mobile apparatus that the user wishes to start making a note or to draw something. The predetermined gesture may be, for example, that the user keeps his finger on the screen unmoved for a predetermined period of time, for example, one second. In response to the predetermined gesture, the mobile apparatus enters into an inking mode which enables input of data directly on the screen relating to the locked state, and the mobile apparatus captures data input on the screen while the mobile apparatus remains in the locked state. In another example, the user may touch a certain icon on the screen to initiate the inking mode.

In another example, when the user touches the screen while the mobile apparatus is in the locked state, the mobile apparatus is configured to acquire the fingerprint of the finger touching the screen. If the fingerprint matches with a prestored fingerprint, the mobile apparatus enters into the inking mode.

In one example of FIG. 7A or 7B, further processing options (pin to glance, save, cancel) may not be shown to the user at first when the user starts writing on the screen thus allowing a maximum writing space. Only when the user hovers the pen or moves his finger towards the top of the screen, a drawer can come down, revealing different processing options related to that note.

In one example of FIG. 7A or 7B, instead of providing a glance screen on the display of the mobile apparatus, a lock screen may be provided. The user may have configured that the lock screen shows a user-defined background picture. When the mobile apparatus enters the inking mode, the mobile apparatus may be configured to fade the lock screen after entering into the inking mode. By fading the lock screen, the user experience is enhanced since the data input by the user on the lock screen is more clearly visible.

In one example of any of FIGS. 2-7B, data input by the user in the inking mode may also be passed from one application to another. For example, when data input in the inking mode starts, the data is captured by the lock screen software. At the same time, the mobile apparatus may load a second application, for example, a note taking application. Once the second application has been loaded, then the data input is transferred to the second application. This might not be visible to the user via the user interface of the mobile apparatus, thus providing a seamless transition.

In at least one of the above examples, at least one of the following may be provided. When the user is able to start providing data input directly on the screen relating to the locked state, a better end-user experience is provided. By doing away with unnecessary user interface and navigation, the fastest possible note-taking experience is enabled and this experience is at par with pen and paper. Further, a new interaction layer is created with the mobile apparatus that is independent of the underlying visual user interface. This layer allows the user to interact and input content to the mobile apparatus, for example, using a pen, completely bypassing unnecessary interactions required to express intent to write. Further, the user is also able to write on the mobile apparatus display without even pressing a single button on the mobile apparatus. In effect, the user does not need to waste time unlocking the mobile apparatus or interacting with unnecessary user interface functions. Further, as the user's intent to write may be captured by detecting the user's grip on the pen, it is possible to prepare for the act of note taking. Further, when a pen is used with a mobile apparatus, it is possible to create a cheaper version of the pen without any special electronics. The user can enable note taking by just bringing a capacitive stylus tip to the screen of the mobile apparatus.

An example of an apparatus comprises at least one processing unit and at least one memory. The at least one memory stores program instructions that, when executed by the at least one processing unit, cause the mobile apparatus to detect an intention to input data on a screen relating to a locked state of the mobile apparatus, enter into an inking mode, the inking mode enabling input of data directly on the screen relating to the locked state, and capture data input on the screen relating to the locked state while the mobile apparatus remains in the locked state.

In one example, the at least one memory stores program instructions that, when executed by the at least one processing unit, cause, when detecting an intention to input data, the mobile apparatus to perform at least one of: detect a pen tip hovering over the screen, detect a pen tip touching the screen, detect a predetermined gesture with a finger on the screen, detect that the mobile apparatus is being held in a hand, detect a press of a power button of the mobile apparatus, and receive a signal from a pen indicating that the pen is being held in a hand.

In one example, alternatively or in addition, the at least one memory stores program instructions that, when executed by the at least one processing unit, cause, when detecting an intention to input data and entering into an inking mode, the mobile apparatus to recognize a finger on the screen, acquire the fingerprint of the finger, and enter into the inking mode when matching the fingerprint with a prestored fingerprint.

In one example, alternatively or in addition, the at least one memory stores program instructions that, when executed by the at least one processing unit, cause the mobile apparatus to load an application enabling the input of data directly on the screen relating to the locked state when entering into the inking mode.

In one example, alternatively or in addition, the at least one memory stores program instructions that, when executed by the at least one processing unit, cause the mobile apparatus to detect a pen tip hovering over the screen, preload at least one application module in the background in response to detecting the pen tip hovering over the screen, detect touch of the tip of the pen on the screen, and execute the at least one application in response to detecting the touch of the tip of the pen on the screen.

In one example, alternatively or in addition, the at least one memory stores program instructions that, when executed by the at least one processing unit, cause the mobile apparatus to execute, on the background, an application enabling detection of a pen tip or finger on the screen relating to the locked state.

In one example, alternatively or in addition, the at least one memory stores program instructions that, when executed by the at least one processing unit, cause the mobile apparatus to fade the screen after entering into the inking mode.

In one example, alternatively or in addition, the at least one memory stores program instructions that, when executed by the at least one processing unit, cause the mobile apparatus to provide on the screen at least one option to process the captured data.

In one example, alternatively or in addition, the at least one memory stores program instructions that, when executed by the at least one processing unit, cause the mobile apparatus to: start to capture the input data with a first application, load a second application, and transfer the input data to the second application when the second application has been loaded.

In one example, alternatively or in addition, the screen relating to the locked state is a lock screen, a blank screen, a glance screen or a screen of a state where the mobile apparatus is in a low-power display mode.

An example of a computer-readable storage medium comprises executable instructions for causing at least one processor to perform operations comprising: detecting an intention to input data on a screen relating to a locked state of a mobile apparatus, entering into an inking mode, the inking mode enabling input of data directly on the screen relating to the locked state, and capturing data input on the screen relating to the locked state while the mobile apparatus remains in the locked state.

An example of a computer program comprises executable instructions for causing at least one processor to perform operations comprising: detecting an intention to input data on a screen relating to a locked state of a mobile apparatus, entering into an inking mode, the inking mode enabling input of data directly on the screen relating to the locked state, and capturing data input on the screen relating to the locked state while the mobile apparatus remains in the locked state.

An example of a method comprises detecting an intention to input data on a screen relating to a locked state of a mobile apparatus, entering into an inking mode, the inking mode enabling input of data directly on the screen relating to the locked state, and capturing data input on the screen relating to the locked state while the mobile apparatus remains in the locked state.

In one example, detecting an intention to input data comprises at least one of: detecting a pen tip hovering over the screen; detecting a pen tip touching the screen, detecting a predetermined gesture with a finger on the screen, detecting that the mobile apparatus is being held in a hand, detecting a press of a power button of the mobile apparatus, and receiving a signal from a pen indicating that the pen is being held in a hand.

In one example, alternatively or in addition, the method comprises recognizing a finger on the screen, acquiring the fingerprint of the finger, and entering into the inking mode when matching the fingerprint with a prestored fingerprint.

In one example, alternatively or in addition, the method comprises loading an application enabling the input of data directly on the screen relating to the locked state when entering into the inking mode.

In one example, alternatively or in addition, the method comprises detecting a pen tip hovering over the screen, preloading at least one application module in the background in response to detecting the pen tip hovering over the screen, detecting touch of the tip of the pen on the screen, and executing the at least one application in response to detecting the touch of the tip of the pen on the screen.

In one example, alternatively or in addition, the method comprises executing, on the background, an application enabling detection of a pen tip or finger on the screen relating to the locked state.

In one example, alternatively or in addition, the method comprises fading the screen after entering into the inking mode.

In one example, alternatively or in addition, the method comprises providing on the screen at least one option to process the captured data.

In one example, alternatively or in addition, the method comprises starting to capture the input data with a first application, loading a second application, and transferring the input data to the second application when the second application has been loaded.

In one example, alternatively or in addition, the screen relating to the locked state is a lock screen, a blank screen, a glance screen or a screen of a state where the mobile apparatus is in a low-power display mode.

An example of a mobile apparatus comprises means for detecting an intention to input data on a screen relating to a locked state of the mobile apparatus, means for entering into an inking mode, the inking mode enabling input of data directly on the screen relating to the locked state, and means for capturing data input on the screen relating to the locked state while the mobile apparatus remains in the locked state.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a- chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. A mobile apparatus, comprising:
   at least one processing unit;
   at least one memory;
   wherein the at least one memory stores program instructions that, when executed by the at least one processing unit, cause the mobile apparatus to:
      detect an intention to input data on a screen during a locked state of the mobile apparatus by receiving a signal from an object;
      preload at least one application module in a background in response to detecting the signal;
      enable a detection of a touch of the object on the screen;
      detect the touch of the object on the screen;
      execute the at least one application module in response to detecting the touch of the object on the screen by entering into an inking mode, the inking mode enabling input of notes directly on the screen relating to the locked state; and
      capture the notes input on the screen relating to the locked state while the mobile apparatus remains in the locked state.

2. A mobile apparatus according to claim 1, wherein the object is a pen.

3. A mobile apparatus according to claim 2, wherein the signal indicates that the pen is held in a hand.

4. A mobile apparatus according to claim 1, wherein the at least one memory stores program instructions that, when executed by the at least one processing unit, cause, when detecting another intention to input data, the mobile apparatus to detect a predetermined gesture with a finger on the screen.

5. A mobile apparatus according to claim 1,
   wherein the screen relating to the locked state is a lock screen, a glance screen or a screen of a state where the mobile apparatus is in a low-power display mode.

6. A mobile apparatus according to claim 1, wherein the at least one memory stores program instructions that, when executed by the at least one processing unit, cause the mobile apparatus to:
   load a second application module enabling the input of the notes directly on the screen when entering into the inking mode.

7. A mobile apparatus according to claim 1, wherein detecting the intention to input data on the screen comprises detecting a vicinity of the object to the screen.

8. A mobile apparatus according to claim 1, wherein the at least one memory stores program instructions that, when executed by the at least one processing unit, cause the mobile apparatus to:
   while still in a locked state, fade the screen after entering into the inking mode.

9. A mobile apparatus according to claim 1, wherein the at least one memory stores program instructions that, when executed by the at least one processing unit, cause the mobile apparatus to:
   provide on the screen at least one option to process the captured notes while still in the locked state.

10. A mobile apparatus according to claim 1, wherein detecting the intention to input data on the screen comprises detecting that the object is being held in a hand.

11. A method, comprising:
    detecting an intention to input data on a screen during a locked state of a mobile apparatus by detecting a signal from an object;
    preloading at least one application module in a background in response to detecting the signal;
    enabling a detection of a touch of the object on the screen;
    detecting the touch of the object on the screen;
    executing the at least one application module in response to detecting the touch of the object on the screen by entering into an inking mode, the inking mode enabling input of notes directly on the screen relating to the locked state; and
    capturing the notes input on the screen relating to the locked state while the mobile apparatus remains in the locked state.

12. A method according to claim 11, further comprising receiving the signal from a pen.

13. A method according to claim 12, wherein the signal indicates that the pen is being held in a hand.

14. A method according to claim 11, wherein detecting the intention to input data on the screen comprises detecting a vicinity of the object to a display.

15. A method according to claim 11, further comprising fading the screen after entering into the inking mode.

16. A method according to claim 11, wherein the screen relating to the locked state is a lock screen, a glance screen or a screen of a state where the mobile apparatus is in a low-power display mode.

17. A computer-readable storage device comprising executable instructions for causing at least one processor to perform operations comprising:
- detecting an intention to input data on a screen relating to a locked state of a mobile apparatus by detecting a signal from an object;
- preloading at least one application module in a background in response to detecting the signal;
- enabling a detection of a touch of the object on the screen;
- detecting the touch of the object on the screen;
- executing the at least one application module in response to detecting the touch of the object on the screen by entering into an inking mode, the inking mode enabling input of notes directly on the screen relating to the locked state; and
- capturing the notes input on the screen relating to the locked state while the mobile apparatus remains in the locked state.

18. The computer-readable storage device according to claim 17, wherein detecting the intention to input data on the screen comprises detecting that the object is being held in a hand.

19. The computer-readable storage device according to claim 17, wherein detecting the intention to input data on the screen comprises detecting a vicinity of the object to the screen.

20. The computer-readable storage device according to claim 17, wherein detecting the intention to input data on the screen comprises detecting a press of a button on the object.

* * * * *